US007844676B2

(12) United States Patent
Prahlad et al.

(10) Patent No.: US 7,844,676 B2
(45) Date of Patent: *Nov. 30, 2010

(54) EMAIL ATTACHMENT MANAGEMENT IN A COMPUTER SYSTEM

(75) Inventors: Anand Prahlad, East Brunswick, NJ (US); Randy De Meno, Staten Island, NY (US); Jeremy A. Schwartz, Red Bank, NJ (US); James J. McGuigan, Avon, NJ (US)

(73) Assignee: CommVault Systems, Inc., Oceanport, NJ (US)

(*) Notice: Subject to any disclaimer, the term of this patent is extended or adjusted under 35 U.S.C. 154(b) by 1026 days.

This patent is subject to a terminal disclaimer.

(21) Appl. No.: 11/608,731

(22) Filed: Dec. 8, 2006

(65) Prior Publication Data

US 2007/0143431 A1    Jun. 21, 2007

Related U.S. Application Data

(63) Continuation of application No. 09/774,272, filed on Jan. 30, 2001, now Pat. No. 7,155,481.

(60) Provisional application No. 60/179,343, filed on Jan. 31, 2000.

(51) Int. Cl.
*G06F 15/16* (2006.01)
(52) U.S. Cl. ............... 709/206; 709/207; 709/223; 709/203; 715/752
(58) Field of Classification Search ......... 709/206–207, 709/203, 223, 217; 715/751, 752
See application file for complete search history.

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

EP        0259912        3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Philip B Tran
(74) *Attorney, Agent, or Firm*—Perkins Coie LLP

(57) ABSTRACT

An e-mail management system that includes an e-mail browser having a time variance interface that provides for storage into a storage media of e-mail messages that have been received over time. The time variance interface of the e-mail browser also provides for retrieval, from the storage media, of the e-mail messages corresponding to a user specified date. The retrieved e-mail messages each include an indication of the presence of an accompanying attachment(s) in the e-mail message. An affirmative indication provides the user with an option of retrieving content of the attachment(s) from the storage media such that the content of the attachment(s) is retrieved by the e-mail browser only when specifically requested by the user.

12 Claims, 8 Drawing Sheets

U.S. PATENT DOCUMENTS

| | | | |
|---|---|---|---|
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,448,724 A | 9/1995 | Hayashi et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,619,644 A | 4/1997 | Crockett et al. | |
| 5,638,509 A | 6/1997 | Dunphy et al. | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson et al. | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,076,148 A | 6/2000 | Kedem et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton et al. | |
| 6,330,589 B1* | 12/2001 | Kennedy | 709/206 |
| 6,330,642 B1 | 12/2001 | Carteau | |
| 6,343,324 B1 | 1/2002 | Hubis et al. | |
| 6,351,764 B1* | 2/2002 | Voticky et al. | 709/206 |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,421,709 B1* | 7/2002 | McCormick et al. | 709/206 |
| 6,421,711 B1 | 7/2002 | Blumenau et al. | |
| 6,487,561 B1 | 11/2002 | Ofek et al. | |
| 6,519,679 B2 | 2/2003 | Devireddy et al. | |
| 6,535,910 B1* | 3/2003 | Suzuki et al. | 709/207 |
| 6,538,669 B1 | 3/2003 | Lagueux, Jr. et al. | |
| 6,564,228 B1 | 5/2003 | O'Connor | |
| 6,615,241 B1* | 9/2003 | Miller et al. | 709/206 |
| 6,658,526 B2 | 12/2003 | Nguyen et al. | |
| 6,874,023 B1* | 3/2005 | Pennell et al. | 709/224 |
| 6,941,304 B2* | 9/2005 | Gainey et al. | 709/206 |
| 2003/0097361 A1* | 5/2003 | Huang et al. | 707/10 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

\* cited by examiner

EMAIL ATTACHMENT MANAGEMENT IN A COMPUTER SYSTEM

CROSS-REFERENCE TO RELATED APPLICATIONS

This is a continuation application of U.S. patent application Ser. No. 09/774,272, filed Jan. 30, 2001, now U.S. Pat. No. 7,155,481 which claims the benefit of U.S. Provisional Patent Application Ser. No. 60/179,343, filed Jan. 31, 2000, each of which is hereby incorporated by reference in its entirety.

BACKGROUND

1. Field of the Invention

The present invention generally relates to data storage in email systems and more particularly to the logical view with granular access to exchange data managed by a modular data and storage management system.

2. Description of the Related Art

Traditional methods have involved restoring the Microsoft Exchange Database in its entirety even if the goal of the operation was to restore just a single object (e-mail message). Such methods take much longer to accomplish operation (because of volume of data transferred during restores), require the Microsoft Exchange database to be taken offline, and may require extra disk storage to store a temporary copy of the restored data.

Typical storage and retrieval computer systems provide a user with resources to store digital files such as word processing files, email files, etc. and to retrieve the digital files when desired. These digital files of the computer system are commonly backed up to a new location on the computer system itself or even to a completely different and separate storage facility such as a magnetic tape, a different disk drive, etc. Backing up digital files provides an alternate source(s) to access the digital files when the digital files have become corrupted, lost, written over, no longer accessible due to hardware failure, etc.

Many other problems and disadvantages of the prior art will become apparent to one skilled in the art after comparing such prior art with the present invention as described herein.

SUMMARY OF THE INVENTION

Various aspects of the present invention may be realized through an e-mail management system that includes an e-mail browser having a time variance interface that provides for storage into a storage media of e-mail messages that have been received over time. The time variance interface of the e-mail browser also provides for retrieval, from the storage media, of the e-mail messages corresponding to a user specified date. The retrieved e-mail messages each include an indication of the presence of an accompanying attachment(s) in the e-mail message. An affirmative indication provides the user with an option of retrieving content of the attachment(s) from the storage media such that the content of the attachment(s) is retrieved by the e-mail browser only when specifically requested by the user.

In certain embodiments, the retrieved e-mail messages cause the e-mail browser to appear as it appeared on the user specified date. In other words, the retrieved e-mail messages create a state of the e-mail browser that corresponds to an earlier state of the e-mail browser as the earlier state appeared on the e-mail browser at the user specified date. The storage media of the e-mail management system may be divided into more than one subset of storage media to provide a separate location for the attachment(s) of the e-mail messages that are stored. The e-mail management system may also include a retrieval manager module having a master storage and backup map that is used to direct access to the e-mail messages of the storage media such that data in the attachment(s) is retrieved only when specifically requested by the user.

Various aspects of the present invention may also be found through a method for an e-mail system to display an e-mail browser with information that corresponds to a state of the e-mail system on a user specified date. The method includes receiving at least one e-mail message in the e-mail system; storing the at least one e-mail message into a storage media via an organizational scheme that provides a separate storage location for attachment(s), if any, of the at least one e-mail message; indexing the stored at least one e-mail message according to the date that the at least one e-mail message was originally received and according to the storage location of the at least one e-mail message; specifying a date on which to view the state of the e-mail system with the e-mail browser: and retrieving, with the e-mail browser, the stored at least one e-mail messages that correspond to the state of the e-mail system on the specified date, each of the retrieved e-mail messages including an option to retrieve the attachment(s), if any. Selecting the option to retrieve the attachment(s) involves retrieving the attachment(s) from the separate storage location of the storage media by the e-mail browser.

Still other aspects of the present invention may be realized through a method for an e-mail system to display an e-mail browser with information that corresponds to a state of the e-mail system on a user specified date. In this embodiment, the method involves receiving at least one e-mail message in the e-mail system; storing the at least one e-mail message into a first storage media and a second storage media. The first storage media excludes attachment(s) and the second storage media is solely for attachment(s), if any, of the at least one e-mail message. The method also includes indexing the stored at least one e-mail messages according to the date the at least one e-mail message was originally received; specifying a date on which to view the state of the e-mail system with the e-mail browser; and retrieving, from the first storage media, the stored at least one e-mail messages that correspond to the state of the e-mail system on the specified date, each of the retrieved e-mail messages displayed in the e-mail browser and including an option to retrieve the attachment(s), if any, from the second storage media. The method may also include selecting the option to retrieve the attachment(s) of one of the retrieved e-mail messages to thereby transfer data associated with the attachment(s) from the second storage media to the e-mail browser.

Other aspects of the present invention will become apparent with further reference to the drawings and specification which follow.

BRIEF DESCRIPTION OF THE DRAWINGS

In one embodiment of the present invention, certain aspects may be realized when data retrieval of an object or small collections of objects take only a small fraction of the time taken by traditional storage methods. Also, users may be allowed to view, in detail, exactly what objects are available for restore and their attributes at a given point-in-time. Users can also search for objects based on their attributes before choosing to retrieve them. All browsing and restoring of data is done without compromising availability of the Microsoft Exchange database.

Archival, retrieval, and indexing of Microsoft Exchange data as distinct end-user recognizable objects (such as an email message) with ability to browse these objects is enabled using certain aspects of the present invention. Also enabled is browsing of data at a user defined point-in-time, viewing different versions of the same object backed up at different points-in-time, and pattern searches in a logical view that the users are familiar with. Also enabled is the retrieval of objects backed up from one Microsoft Exchange database to a different target Microsoft Exchange target database.

DETAILED DESCRIPTION OF THE DRAWINGS

Figure 1:
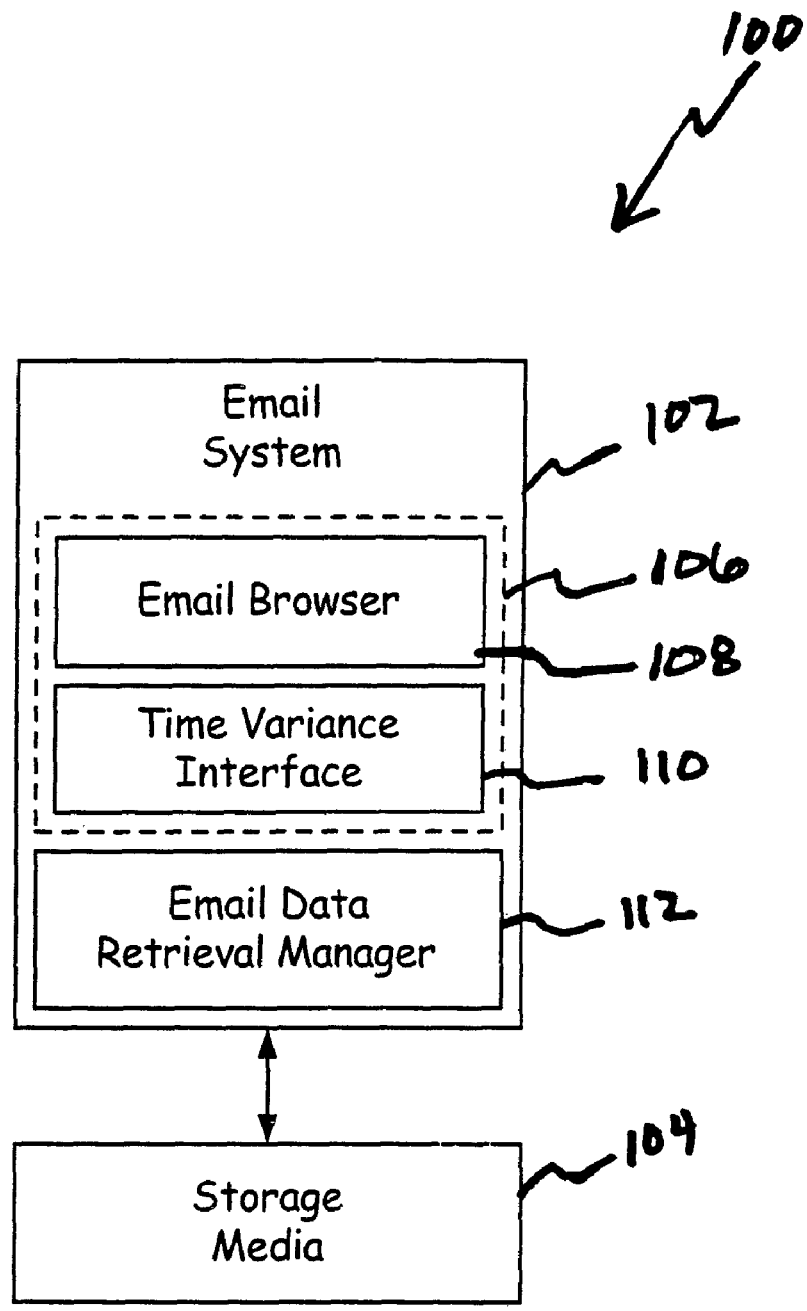
FIG. 1 is a block diagram of an exemplary embodiment of a data and storage management system built in accordance with principals of the present invention.

FIG. 1 is a block diagram of an exemplary embodiment of a data and storage management system 100 built in accordance with principals of the present invention. The data and storage management system 100 includes an e-mail system 102 that communicates with a storage media 104 to access and store e-mail that is received in or sent from the e-mail system 102. The e-mail system 102 includes a retrieval application 106 that has an e-mail browser 108 and a time variance interface 110 for interfacing with an e-mail data retrieval manager 112. The e-mail data retrieval manager 112 interfaces with the storage media 104 to access e-mail that has been received in the e-mail system 102. The email data retrieval manager 112 is configured to provide storage in the storage media 104 for e-mail attachments. This storage for the e-mail attachments is separate from the storage for the emails themselves. In other words, e-mail attachment storage is outside the storage for general emails.

The data and storage management system 100 allows a user to access e-mail from the storage media 104 in numerous manners including accessing e-mail from a particular date such that the e-mail browser 108 appears as though it is operating on a given date and time other than the current date and time. Thus, if the user desires to view the system in the past, the user may see the e-mail system 102 as it existed at any time. By storing the e-mail attachments, if any, separately from the e-mails, the e-mail system 102 is able to function more efficiently than if it were required to access an e-mail attachment each time the e-mail system 102 is requested to display the system on a particular date in the past. The e-mail system 102 operates more efficiently because attachments are not transferred unless specifically requested by a user.

Figure 2:
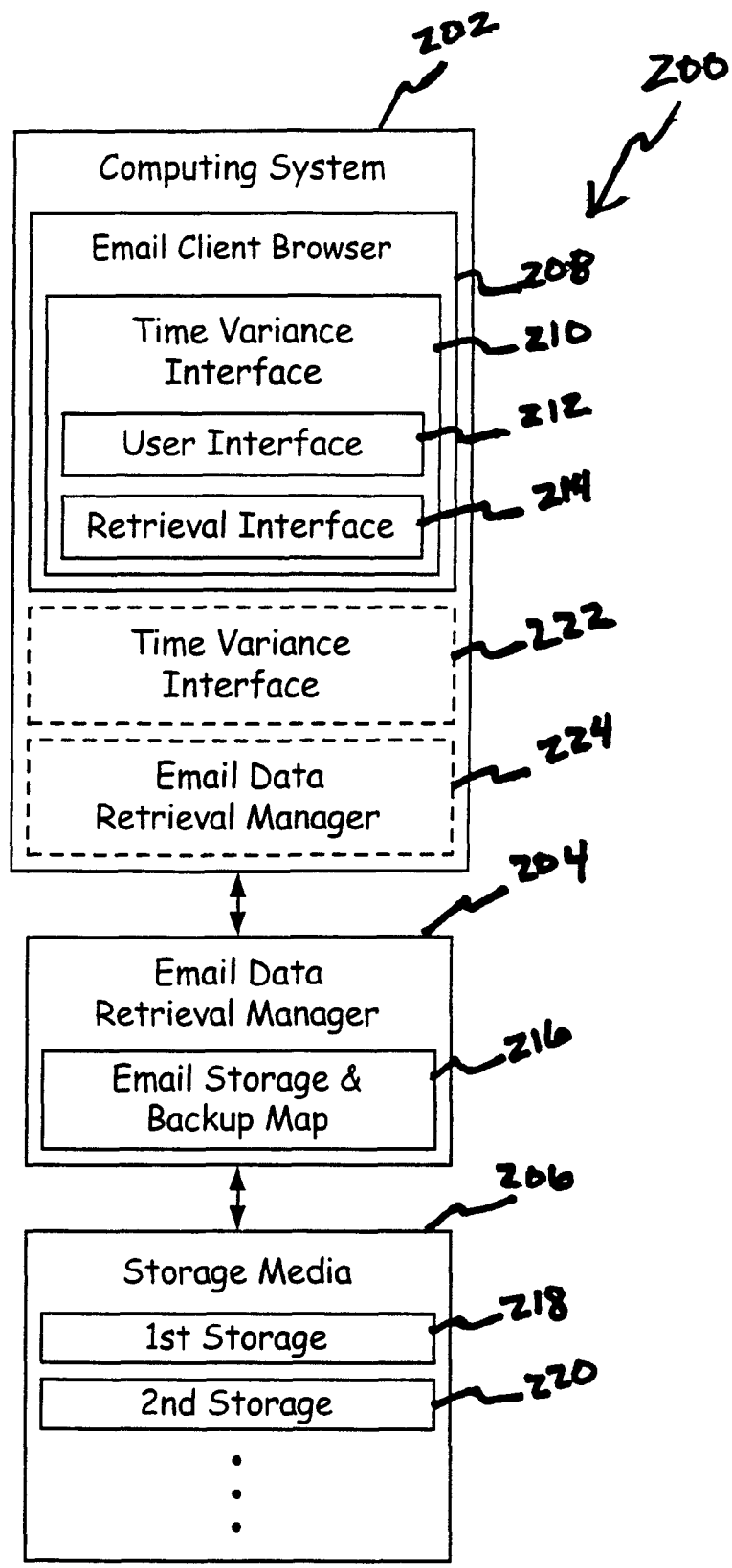
FIG. 2 is a block diagram of an exemplary data and storage management system.

FIG. 2 is a block diagram of an exemplary data and storage management system 200. The data and storage management system 200 includes a computing system 202 that interacts with an e-mail data retrieval manager 204 to retrieve and store messages from storage media 206.

The computing system 202 includes an e-mail client browser 208 that includes a time variance interface 210. The time variance interface 210 includes a user interface 212 and a retrieval interface 214. The retrieval interface 214 interacts with the e-mail data retrieval manager 204 and accesses information according to directions found in an e-mail storage and backup map 216. The e-mail storage and backup map 216 includes information that allows the retrieval interface 214 to assist the e-mail client browser 208 in retrieving data from the storage media 206. For example, e-mail messages are retrieved without attachments unless the attachment is specifically requested. The storage media 206 includes numerous types of storage media which are labeled as a first storage media 218 and a second storage media 220. Of course, many more instances of storage media could exist on the storage media 206 as indicated by the dots representing continued storage media. Retrieving e-mail messages without attachments provides quick access to the state of all e-mails in the computing system 202.

The dashed lines in FIG. 2 indicate optional variations and additions to the data and storage management system 200. For example, a time variance interface 222 may be included in the computing system 202 to assist in retrieval of e-mail messages. Also, an e-mail data retrieval manager 224 may be included to alleviate some of the processing that would otherwise take place at the e-mail data retrieval manager 204.

Figure 3:
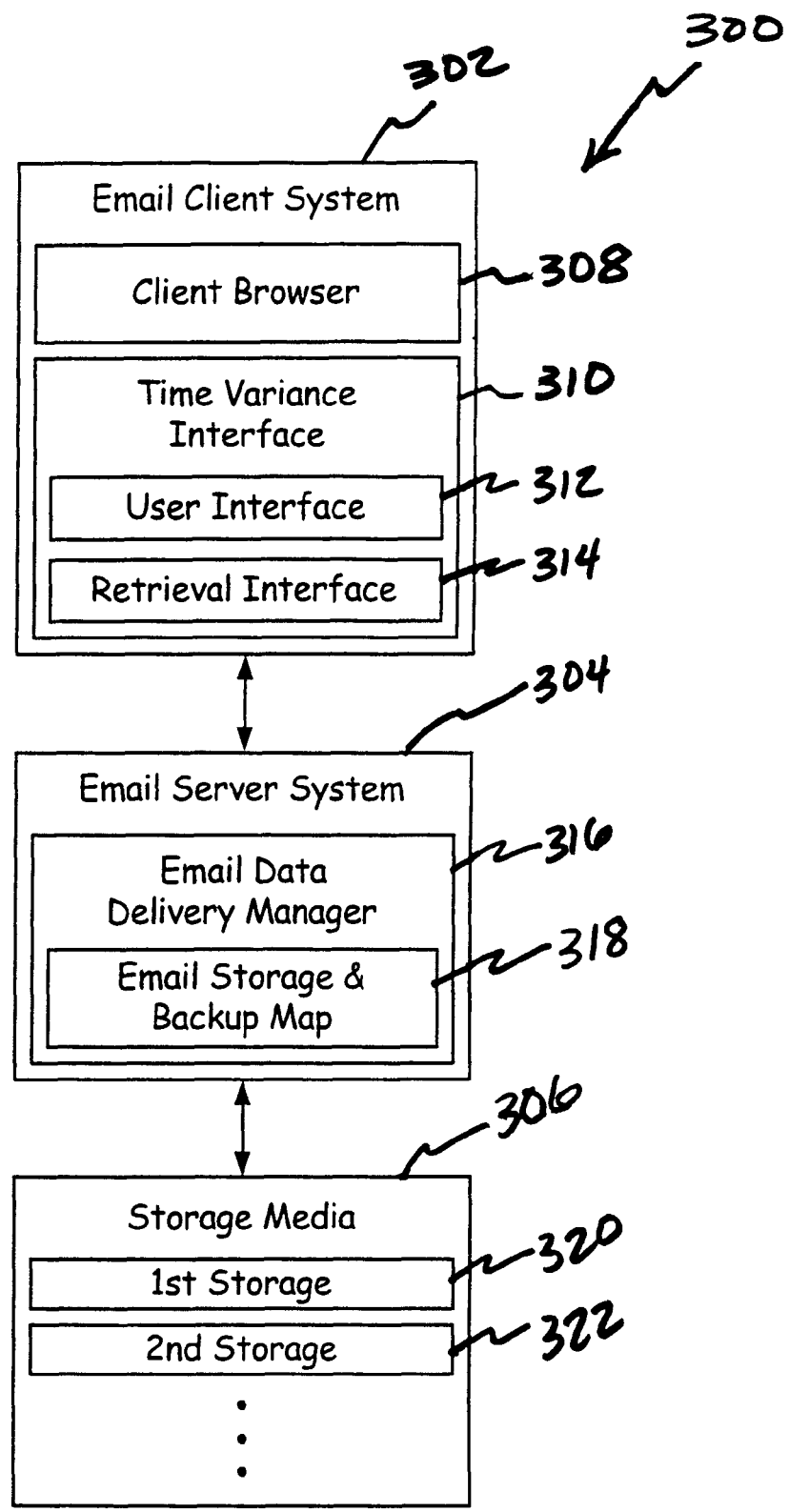
FIG. 3 is a block diagram of an exemplary embodiment of another data and storage management system.

FIG. 3 is a block diagram of an exemplary embodiment of another data and storage management system 300. The data and storage management system 300 includes an e-mail client system 302, an e-mail server system 304, and storage media 306. The e-mail client system 302 includes a client browser 308 and a time variance interface 310. The time variance interface 310 includes a user interface 312 and a retrieval interface 314.

The e-mail server system 304 includes an e-mail data delivery manager 316 which operates using an e-mail storage and backup map 318. The e-mail storage and backup map 318 directs the client browser 308 where to go in the storage media 306 to access an e-mail message. The storage media 306 includes numerous storage media, such as, a first storage media 320 and a second storage media 322. As indicated by the " . . . " more storage media may be added, as necessary, in the storage media 306 of the storage and management system 300. At least one reason for the multiple storage media such as the first and second storage medias 320 and 322 is to provide separate storage for e-mail attachments.

Figure 4:
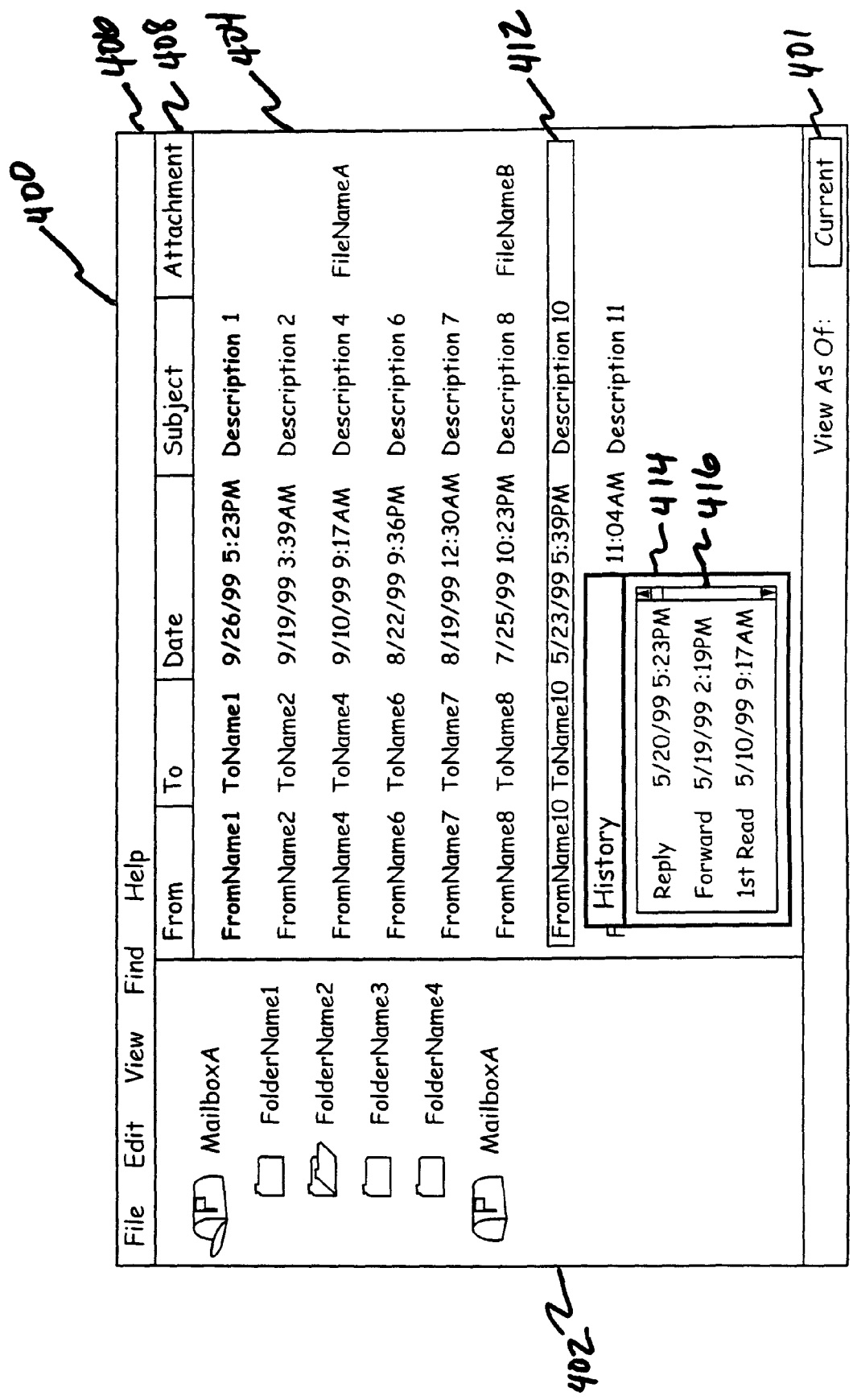
FIG. 4 is an exemplary e-mail browser that may operate in the data and storage management systems of FIGS. 1, 2, and 3.

FIG. 4 is an exemplary e-mail browser 400 that may operate in the data and storage management systems 100, 200, and 300. The e-mail browser 400 includes a "view as of" box 401 where a user may indicate the date of interest for viewing e-mail. As illustrated, the "view as of" box 401 is labeled current to represent the current date of the storage and retrieval system.

The e-mail browser 400 includes a mailbox/folder hierarchy 402 where mailboxes are shown as well as folders that may be accessed. The e-mail browser 400 also includes a message list 404 where each of the messages received in the system are listed. A toolbar 406 is illustrated across the top of the e-mail browser 400. The toolbar 406 includes standard Windows functions such as file, edit, view, find, and help.

The message list 404 includes a message list display selector 408 that allows a user to select which portions of a message to view in the e-mail browser 400. In the e-mail browser 400, the selections shown in the message list display selector 408 are the following: from, to, date, subject, and attachment.

A user may select a message to view as indicated by a selected message 412. When the user selects the message, the user may choose to view the history of the message and activate a history dialog box 414. The history dialog box 414 shows the different stages of the message such as the date the message was first read, forwarded, or replied to. If a user desires to view further states of the messages, the user may activate a scroll bar 416 to view more options for the e-mail message.

Figure 5:
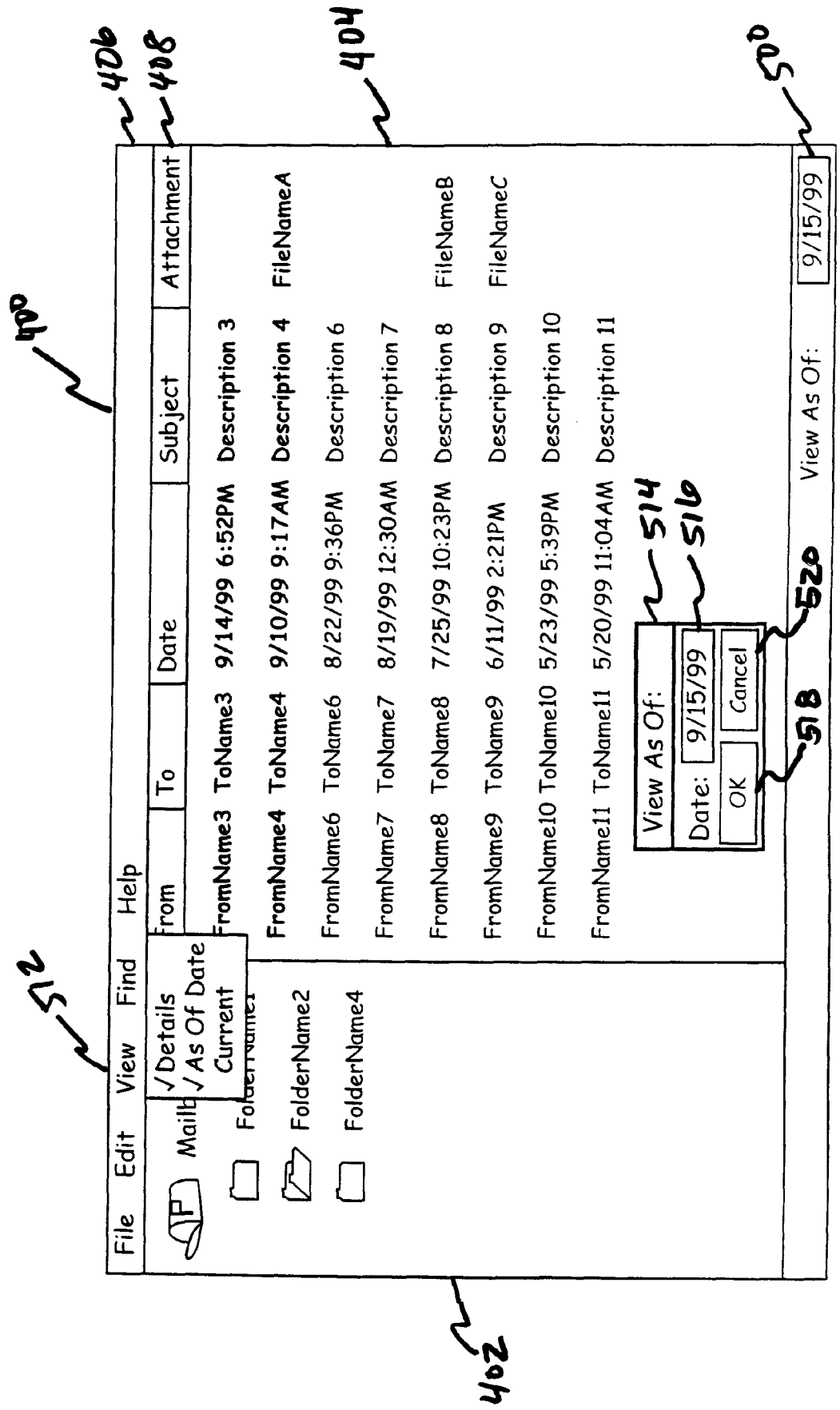
FIG. 5 is an exemplary diagram of the e-mail browser of FIG. 4 as it would appear when other options are selected by a user.

FIG. 5 is an exemplary diagram of the e-mail browser 400 as it would appear when other options are selected by a user. Specifically, a user may choose a different date to view the e-mails as illustrated in a "view as of" box 500 where the date Sep. 15, 1999 has been selected by the user.

Selection of the Sep. 15, 1999 date alters the mailboxes and folders that appear in the mailbox/folder hierarchy 402. As illustrated, only one mailbox appears and not all folder names appear that appeared when the "view as of" date was selected to be "current". Also different in FIG. 5, are the messages that appear in the message list 404. Only messages that were received prior to Sep. 15, 1999 are illustrated in the message list 404. The toolbar 406 and the message list display selector 408 are both identical to the e-mail browser 400 as previously illustrated.

When a view menu 512 is selected, a user may choose which options they desire for their particular needs of the e-mail browser 400. A "view as of" box 514 may be activated by the user and a date box 516 appears which the user can use to enter the date of interest in the e-mail browser 400. After the date has been selected, the user may enter the date into the system by pressing an okay button 518. If the user decides to exit the "view as of" box 514 without making changes, the user can press a cancel button 520.

As illustrated, the message list 404 includes some e-mail messages that have an attachment. Although the attachments are indicated in the message list 404, the content of the attachments are not automatically retrieved from the storage media. Only when the attachment is selected for viewing is the content of the attachment retrieved from the storage media. Thus, the e-mail browser 400 operates in a quick and efficient manner to generate the message list 404 that corresponds to the date specified in the "view as of" box 514.

Figure 6:
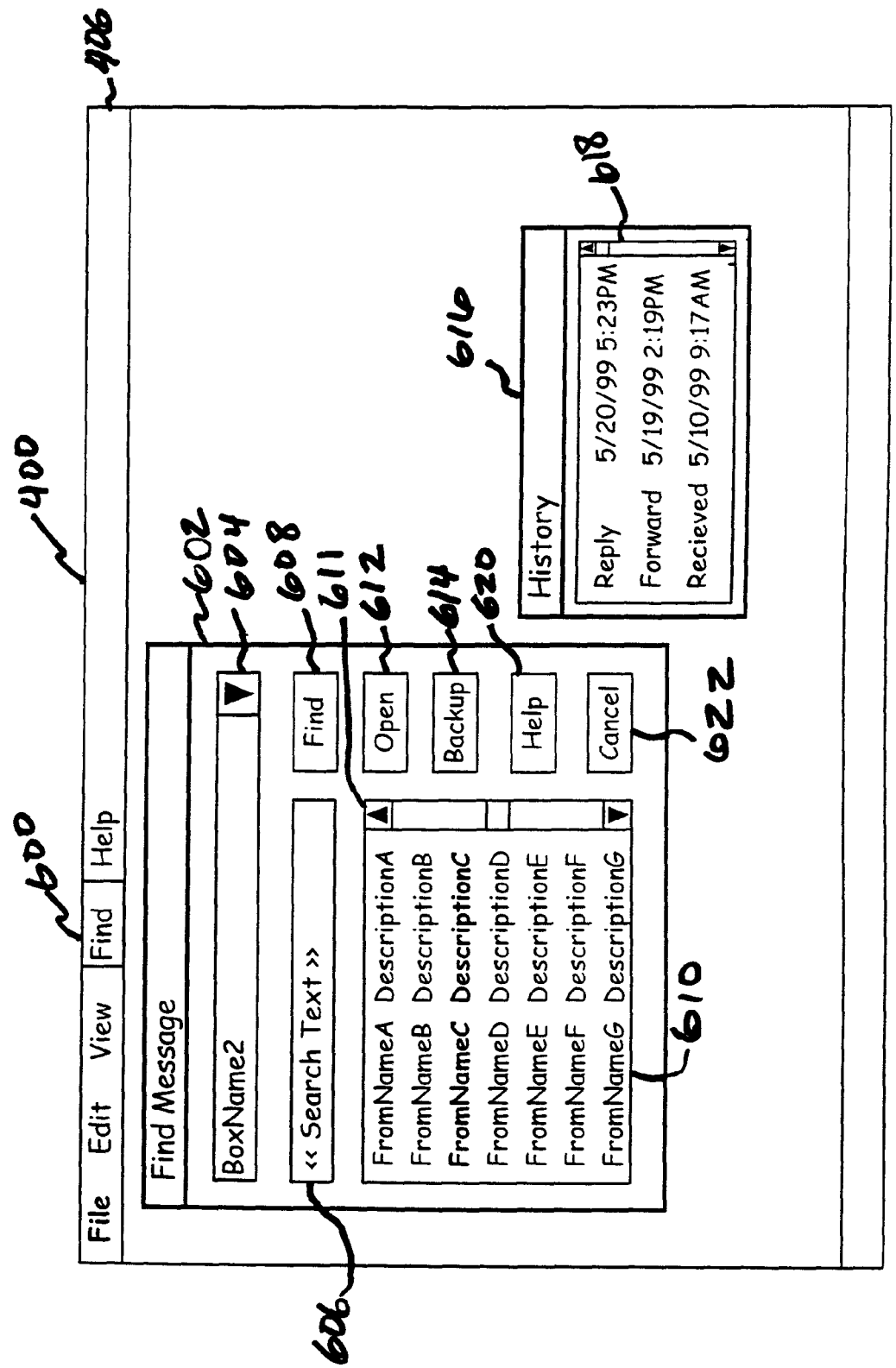
FIG. 6 is an exemplary illustration of the e-mail browser of FIG. 4 as it may be used to find particular messages in the data and storage management systems of FIGS. 1, 2, and 3.

FIG. 6 is an exemplary illustration of the e-mail browser 400 as it may be used to find particular messages in the data and storage management systems 100, 200 and 300. A find menu 600 may be selected by the user from the toolbar 406 and a find message dialog box 602 may be selected to appear on the e-mail browser 400. The find message dialog box 602 includes a boxname selector box 604 where the user can select which mailbox they would like to perform the search in. A search text box 606 is available for the user to enter particular terms of the message for which they would like to search. Of course, the search terms can include wild cards or other custom text for which to find. Upon entry of the search text in the search text box 606, the user presses a find button 608 which causes a search to be performed and all messages which are found appear in a message list 610. The user may use a scroll bar 611 to find the particular message of interest. Upon finding the particular message of interest, the user may press an open button 612 to view the message. The user may also press a backup button 614 to view the usage history of the particular message of interest. When the backup button 614 is pressed, a history box 616 appears and the history of the selected message appears. A scroll bar 618 is available for the user to scroll through the messages if the list goes beyond the bounds of the history box 616. As with typical Windows applications, a help button 620 is available for the user to press when in need of help using the find message dialog box 602. The user may also press a cancel button 622 to exit the find message dialog box 602.

Figure 7:
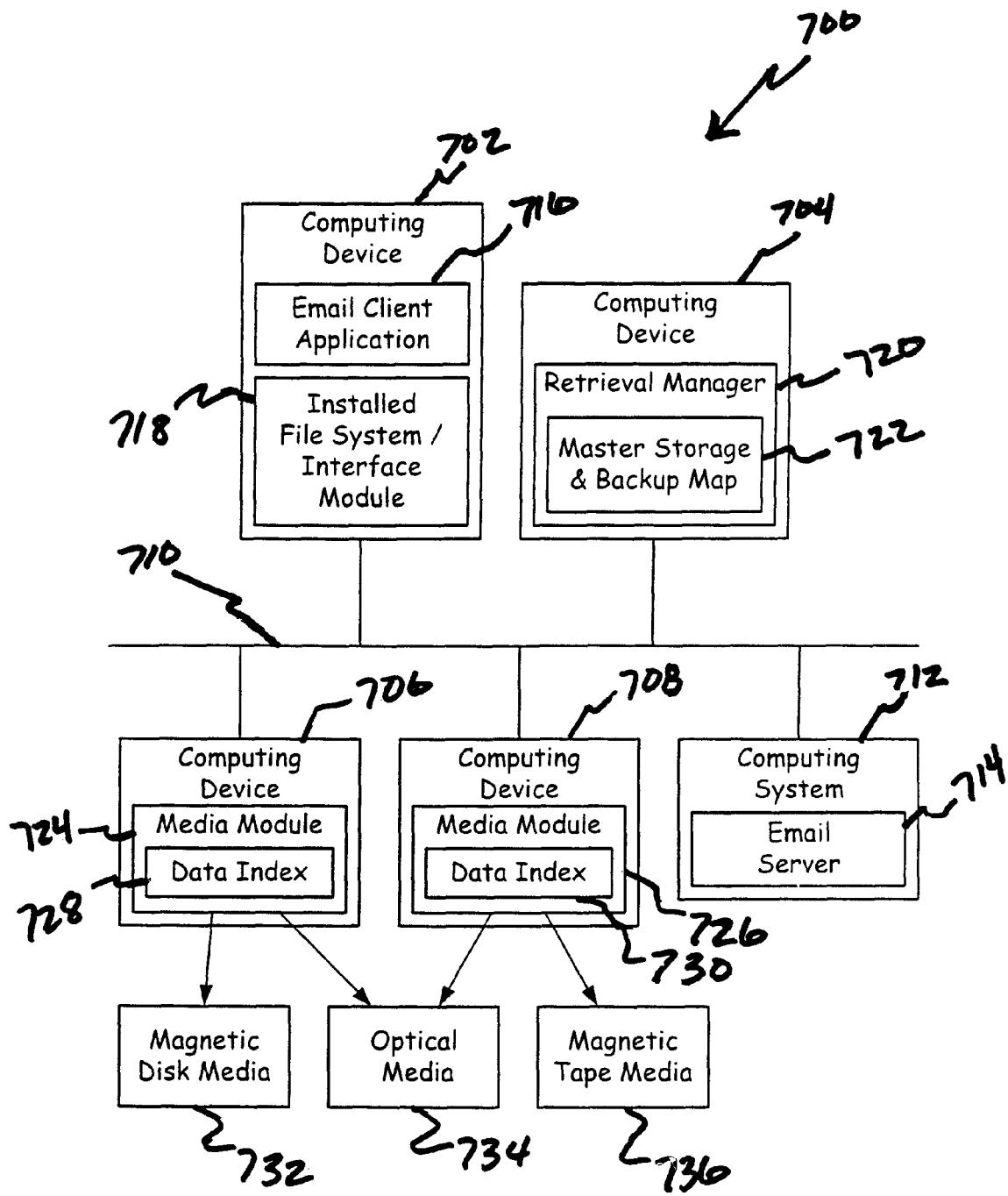
FIG. 7 illustrates an exemplary embodiment of a data and storage management system.

FIG. 7 illustrates an exemplary embodiment of a data and storage management system 700. The data and storage management system 700 includes computing devices 702, 704, 706 and 708 which interact across a network 710, such as an Ethernet network. A computing system 712 is also available to interact with the computing devices 702-708. The computing system 712 includes an e-mail server 714 for receiving and sending e-mails to and from the data and storage management system 700.

When the data and storage management system 700 is in operation, an e-mail client application 716 on the computing device 702 may request to view an e-mail message. Installed file system/interface module 718 interacts with a retrieval manager 720 of the computing device 704. The retrieval manager 720 includes a master storage and backup map 722 that directs the request to one of the computing devices 706 and 708. At the computing devices 706 and 708, respective media modules 724 and 726 exist to help the retrieval request know where the desired message is located. For further assistance in locating the desired message, the media module 724 and 726 include respective data indexes 728 and 730. In this manner, the e-mail client application 716 is able to request a message and the message is retrieved from one of the storage media, i.e., magnetic disk media 732, optical media 734, or magnetic tape media 636. If the message includes an attachment, the attachment is indicated when the message is retrieved, but the content of the attachment is retrieved only upon specific request by a user.

Of course, the storage media illustrated in FIG. 7 is exemplary storage media and additional storage media could be used while the data management scheme is continually tracked by the media modules 724 and 726 of the data and storage management system 700.

Figure 8:
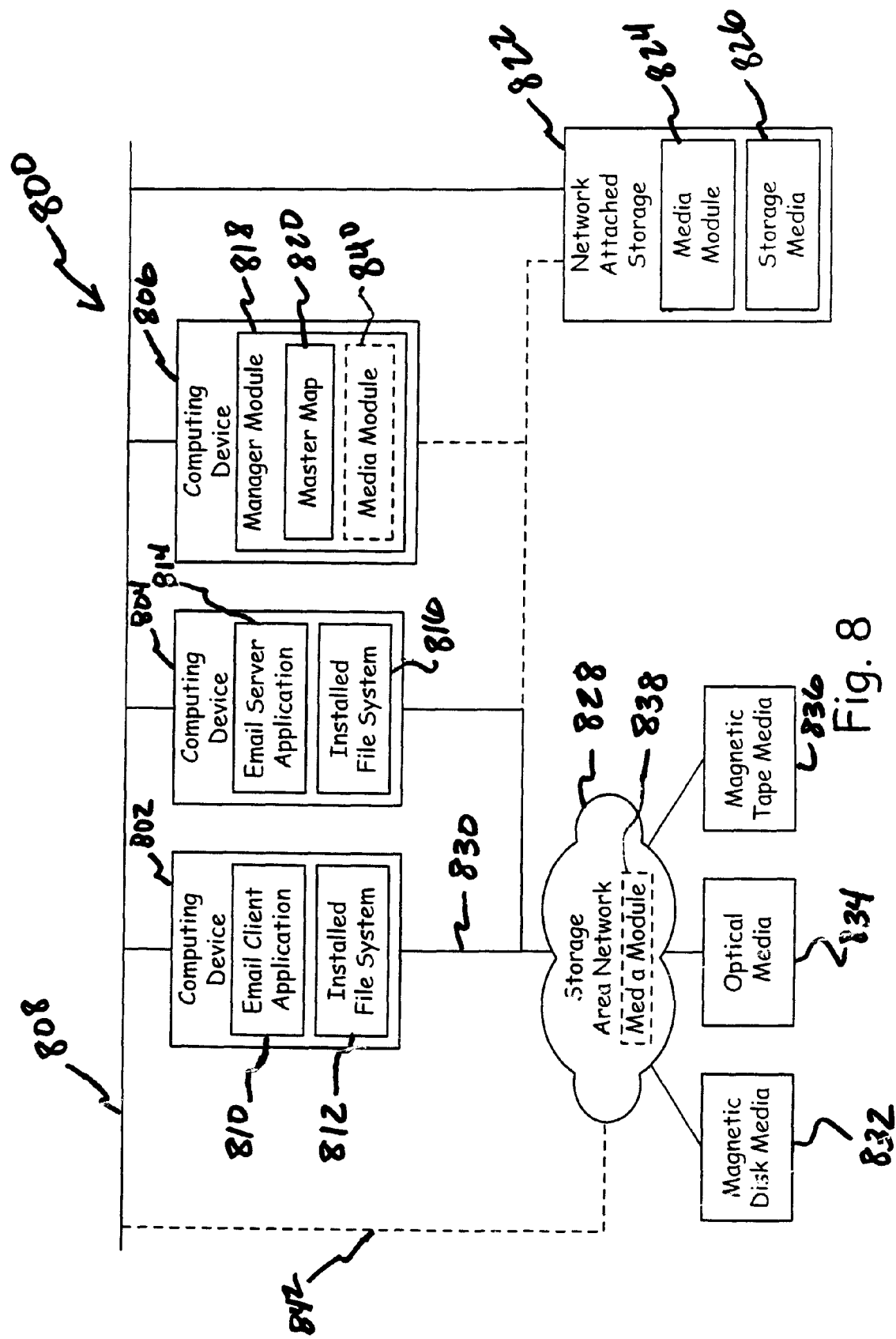
FIG. 8 illustrates an exemplary embodiment of another data and storage management system.

FIG. 8 illustrates an exemplary embodiment of a data and storage management system 800. The data and storage management system 800 includes computing devices 802, 804, and 806 which communicate across a network 808, such as an Ethernet network. An e-mail client application 810 is illustrated in the computing device 802 and may request to view an e-mail message through an installed file system 812. Similarly, an e-mail server application 814 operates on the computing device 804 and interacts with an installed file system 816. The computing devices 802 and 804 commonly interact with the computing device 806 across the network 808 where a manager module 818 is accessed and a master map 820 is available to retrieve more detailed information on the location of messages in the data and storage management system 800. If the e-mail client application 810 has requested an e-mail, the installed file system 812 may interact with a network attached storage 822 where a media module 824 interacts with storage media 826 to retrieve the desired e-mail message requested by the e-mail client application 810.

Alternatively, the installed file system 812 may interact with a storage area network 828 across a network 830, the network 830 commonly being a high speed fibre network. The storage area network 828 makes accessing storage media such as magnetic disk media 832, optical media 834, and magnetic tape media 836 available without significant processing in the computing device 802. To find the exact location of the message, a media module 838 (shown in dashed lines to represent the optional nature of it's location within the storage area network 828) may be used to locate the message. In addition, a media module 840 shown in dashed lines may be available to find the exact location of the message. Also shown in dashed lines is an extension of the network 830 where the network attached storage 822 may include a high speed connection with the computing devices 802, 804, and 806. Finally, the storage area network 828 may communicate directly with the network 808 as indicated by dashed lines 842.

As those skilled in the art will understand upon viewing the present disclosure, certain aspects of the invention may be integrated with other applications (such as document management systems, workflow management systems, etc.) that have been built a top of Microsoft Exchange which allows end users of such systems to access their data transparently across time and versions.

The above-listed sections and included information are not exhaustive and are only exemplary. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. A system for retrieving at least one stored email message from a data storage system coupled to an email system, the system comprising:

means for receiving user input for retrieving the at least one email message from the data storage system coupled to the email system;

means, coupled to the means for receiving, for accessing an index that stores the at least one email message according to a date when the at least one email message was originally received;

wherein the means for receiving also receives input specifying a date on which to view a state of the email system via a displayable user interface associated with the email system;

means, coupled to the means for accessing an index, for retrieving the stored at least one email message from the data storage system coupled to the email system; and, means for displaying the retrieved at least one email message via the displayable user interface associated with the email system, wherein the at least one email message and the displayable user interface associated with the email system appear in substantially the same way as when the at least one email message was originally received, wherein the means for displaying further displays, in substantially the same way as when the at least one email message was originally received, a folder hierarchy within the displayable user interface associated with the email system, an email message list within the displayable user interface associated with the email system, or both of the folder hierarchy and the email message list displayable user interface associated with the email system, and wherein the at least one email message establishes a state of the displayable user interface that corresponds to an earlier state of the displayable user interface as the earlier state for the email system on the date that the at least one email message was originally received.

2. The system of claim 1 further comprising means for selecting an option to retrieve an attachment for the at least one email and to thereby retrieve the attachment from a storage location separate from the data storage system coupled to the email system.

3. The system of claim 1 further comprising means for selecting an option to retrieve an attachment for the at least one email, wherein the attachment is not stored with the at least one email.

4. The system of claim 1 wherein the data storage system coupled to the email system is divided into more than one subset of storage media to provide a separate location for attachments of stored email messages.

5. The system of claim 1 further comprising a retrieval manager module having a master storage and backup map used to direct access to the email messages of the data storage system such that data in attachments is retrieved only when specifically requested.

6. A non-transitory computer-readable medium storing instructions, which, when executed by a computer, perform a method for retrieving at least one stored email message from a data storage system associated with an email system, the method comprising:

receiving user input for retrieving the at least one stored email message from the data storage system associated with the email system;

accessing an index that stores information regarding the at least one email message and a date when the at least one email message was originally received;

receiving input specifying a date on which to view a state of the email system via a displayable user interface for the email system; and retrieving, with the email system, the stored at least one email message from the data storage system associated with the email system, wherein the retrieved at least one email message and a displayable user interface for the email system are displayed in substantially the same state as when the at least one email message was originally received, wherein the displayable user interface is displayed, in substantially the same state as when the at least one email message was originally received, a folder hierarchy within the displayable user interface associated with the email system, an email message list within the displayable user interface associated with the email system, or both of the folder hierarchy and the email message list displayable user interface associated with the email system, and wherein the at least one email message establishes a state of the displayable user interface that corresponds to an earlier state of the displayable user interface as the earlier state for the email system on the date that the at least one email message was originally received.

7. The non-transitory computer-readable medium of claim 6 wherein the method further comprises selecting an option to retrieve an attachment for the at least one email and to thereby retrieve the attachment from a storage location separate from the data storage system coupled to the email system.

8. The non-transitory computer-readable medium of claim 6 wherein the method further comprises selecting an option to retrieve an attachment for the at least one email, wherein the attachment is not stored with the at least one email.

9. A method for retrieving at least one stored email message from a data storage system associated with an email system, the method comprising:

receiving user input for retrieving the at least one stored email message from the data storage system associated with the email system;

accessing an index that stores information regarding the at least one email message and a date when the at least one email message was originally received;

receiving input specifying a date on which to view a state of the email system via a displayable user interface for the email system; and retrieving, with the email system, the stored at least one email message from the data storage system associated with the email system, wherein the retrieved at least one email message and a displayable user interface for the email system are displayed in substantially the same state as when the at least one email message was originally received;

wherein the displayable user interface is displayed, in substantially the same state as when the at least one email message was originally received, a folder hierarchy within the displayable user interface associated with the email system, an email message list within the displayable user interface associated with the email system, or both of the folder hierarchy and the email message list displayable user interface associated with the email system, and wherein the at least one email message establishes a state of the displayable user interface that corresponds to an earlier state of the displayable user interface as the earlier state for the email system on the date that the at least one email message was originally received.

10. A method for an email system to display an email browser with information that corresponds to a state of the email system on a user specified date, the method comprising:

receiving multiple email messages in the email system, wherein at least one of the email messages contains an attachment;

storing the email messages into at least a first data storage device and a second data storage device, wherein the first data storage device stores the email messages and the second data storage device stores the at least one attachment;

indexing the stored email messages according to the date the email messages were originally received;

specifying a date on which to view the state of the email system with the email browser; and restoring the email browser to the state of the email system from the specified date by retrieving, from the first data storage device, the stored email messages that correspond to the state of the email system on the specified date, each of the retrieved email messages being displayed in the email browser and including an option to retrieve any attachments contained in the second data storage device, wherein at least one email message establishes a state of the email browser that corresponds to an earlier state of the email browser as the earlier state for the email system on the date that the at least one email message was originally received.

11. The method of claim 10 further comprising selecting the option to retrieve an attachment contained in the second data storage device of one of the retrieved email messages to thereby transfer data associated with the attachment from the second data storage device to the email browser.

12. The method of claim 10 wherein the first data storage device is a magnetic disk media or optical media and the second data storage device is magnetic tape media.

* * * * *